y borate and about 25% by weight of methanol. Various schemes have been devised to separate pure trimethyl borate from its methanol azeotrope. These include the use of pressure distillation, mineral oil extraction, addition of salts such as lithium chloride, fractional crystallization and the use of sulfuric acid or carbon disulfide. Most of these methods are complicated and uneconomical when used on a large scale.

United States Patent Office 2,880,144
Patented Mar. 31, 1959

2,880,144
AZEOTROPIC EXTRACTIVE DISTILLATION OF TRIMETHYL BORATE

Jack D. Bush, Kansas City, Mo., assignor to Callery Chemical Company, Pittsburgh, Pa., a corporation of Pennsylvania No Drawing. Application September 16, 1954
Serial No. 456,633

5 Claims. (Cl. 202—42)

This invention relates to the separation of pure trimethyl borate from the trimethyl borate-methanol azeotrope by extractive distillation of the methanol with a hydrocarbon.

Trimethyl borate is made in a variety of ways the most common of which involves the reaction of boric acid, boric oxide, or borax with methanol. The net result is an azeotrope containing about 75% by weight of trimethyl borate and about 25% by weight of methanol. Various schemes have been devised to separate pure trimethyl borate from its methanol azeotrope. These include the use of pressure distillation, mineral oil extraction, addition of salts such as lithium chloride, fractional crystallization and the use of sulfuric acid or carbon disulfide. Most of these methods are complicated and uneconomical when used on a large scale.

It is one of the objects of this invention to provide a simple and economical method for separating pure trimethyl borate from the trimethyl borate-methanol azeotrope by extractive distillation.

Another object is to provide a method for separating pure trimethyl borate from its azeotrope with methanol by mixing with a hydrocarbon which forms a lower boiling azeotrope with methanol and distilling the hydrocarbon azeotrope from the mixture.

Another object is to provide a method for recovering trimethyl borate from its methanol azeotrope which can readily be adapted to continuous operation and which has few of the inherent disadvantages of the above mentioned processes.

Other objects of this invention will become apparent from the specification and claims hereinafter related.

This method will be described more completely in the specification and the novelty thereof will be particularly pointed out and distinctly claimed.

This invention is based upon the discovery that certain aliphatic hydrocarbons (particularly 2,3 dimethyl butane) will selectively extract methanol from the trimethyl borate-methanol azeotrope to form a lower boiling hydrocarbon-methanol azeotrope. The hydrocarbon azeotrope can then be distilled off leaving substantially pure trimethyl borate in the still pot. This hydrocarbon-methanol azeotrope has been found to separate readily into its components upon addition of small amounts of water. The hydrocarbon may then be recycled to separate more of the trimethyl borate-methanol azeotrope while the methanol may be separated from the water and used in the production of more trimethyl borate.

After considerable experimentation, certain hydrocarbons were found which form minimum-boiling azeotropes with methanol. These hydrocarbon azeotropes form separable layers and may be distilled from the azeotropic mixture of trimethyl borate and methanol. The hydrocarbons which were found to be operable were isomeric hexanes, such as 2-methylpentane, 3-methylpentane, 2,3-dimethylbutane and 2,2-dimethylbutane and 3-methyl,1-pentene. Normal hexane, however, has been found to be unsatisfactory due to the fact that it forms an azeotrope with trimethyl borate.

The approximate boiling points of the compounds and azeotropes involved in the preferred embodiment of this invention are as follows:

| Substance: | B.P., ° C. |
|---|---|
| Methanol | 64.0 |
| Trimethyl borate | 68.0 |
| Trimethyl borate-methanol azeotrope | 54.6 |
| 2,3-dimethylbutane-methanol azeotrope | 45.0 |

In a typical run carrying out this invention, the trimethyl borate-methanol azeotrope was fed into a fractional distillation column along with a quantity of one or a mixture of isomeric hexanes (other than n-hexane) or 3-methyl,1-pentene, but preferably 2,3-dimethyl butane. The 2,3-dimethylbutane-methanol azeotrope formed in the column and was removed overhead leaving a residue of substantially 100% pure trimethyl borate which was removed from the bottom of the column. The 2,3-dimethylbutane-methanol azeotrope was collected in a settling tank where 1 to 2 weight percent of water was added. The water mixed with the methanol and caused a phase separation to occur with the methanol settling to the bottom of the tank and leaving a top layer of 2,3-dimethyl butane. The 2,3-dimethylbutane and methanol water layers were then separated and the 2,3-dimethyl butane recycled with more trimethyl borate-methanol azeotrope and the methanol was dried (by distillation) and used to prepare more trimethyl borate. In carrying out this process 2,3-dimethylbutane was preferred because it forms an azeotrope with a high proportion of methanol and is more economical and more readily available.

Having thus described the principle and best mode of practicing this invention according to the patent statutes, it is to be understood that within the scope of the appended claims, this invention may be practiced otherwise than as specifically described.

Thus, what is desired to be claimed and secured by Letters Patent of the United States is:

1. A method of continuously separating trimethyl borate from its methanol azeotrope which comprises mixing the azeotrope with a hydrocarbon of the group consisting of 2-methyl pentane, 3 methyl pentane, 2,3-dimethyl butane, 2,2-dimethyl butane and 3-methyl,1-pentene in a fractionating column, removing the resulting hydrocarbon-methanol azeotrope overhead by distillation, and removing substantially pure trimethyl borate from the bottom of said column.

2. A method according to claim 1 in which a mixture of two or more of said hydrocarbons is mixed with the trimethyl borate-methanol azeotrope.

3. A method according to claim 1 in which the hydrocarbon-methanol azeotrope is treated with a small amount of water to cause a separation into two liquid phases and the hydrocarbon is recycled with more trimethyl borate-methanol azeotrope.

4. A method according to claim 3 in which the amount of water used to separate the hydrocarbon-methanol azeotrope is 1 to 2 weight percent of the amount of said azeotrope.

5. A method of continuously separating trimethyl borate from its azeotrope with methanol which comprises mixing said azeotrope with 2,3 dimethyl butane in a fractionating column, removing the azeotrope of 2,3 dimethyl butane and methanol overhead by distillation, removing substantially pure trimethyl borate from the bottom of said column, collecting the 2,3 dimethyl butane azeotrope and adding 1 to 2 weight percent water thereto, recovering the 2,3-dimethyl butane which separates therefrom, and recycling the 2,3 dimethyl butane to the fractionating column.

References Cited in the file of this patent

Schlesinger et al.: Journal of the Amer. Chem. Soc., vol. 75, pp. 213–215 (1953).